United States Patent
Achenbach et al.

(10) Patent No.: US 11,754,110 B2
(45) Date of Patent: Sep. 12, 2023

(54) SELF-TAPPING SCREW

(71) Applicant: EJOT GMBH & CO. KG, Bad Berleburg (DE)

(72) Inventors: Michael Achenbach, Breidenbach (DE); Juergen Behle, Bad Laasphe (DE); Ralf Birkelbach, Bad Laasphe (DE); Volker Dieckmann, Bad Berleburg (DE); Frank Dratschmidt, Bad Berleburg (DE); Jan Hackler, Bad Berleburg (DE); Rene Gerber, Fronhausen (DE); Ralph J. Hellmig, Bad Laasphe (DE); Ilir Selimi, Biedenkopf (DE); Stephan Weitzel, Bad Laasphe (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 297 days.

(21) Appl. No.: 17/251,793

(22) PCT Filed: Jun. 21, 2019

(86) PCT No.: PCT/EP2019/066533
§ 371 (c)(1),
(2) Date: Dec. 12, 2020

(87) PCT Pub. No.: WO2019/243608
PCT Pub. Date: Dec. 26, 2019

(65) Prior Publication Data
US 2021/0115959 A1    Apr. 22, 2021

(30) Foreign Application Priority Data
Jun. 21, 2018    (DE) ...................... 10 2018 114 983.2

(51) Int. Cl.
*F16B 25/10*    (2006.01)
*F16B 25/00*    (2006.01)

(52) U.S. Cl.
CPC ................. *F16B 25/0047* (2013.01)

(58) Field of Classification Search
CPC .................. F16B 25/0068; F16B 25/0047
(Continued)

(56) References Cited

U.S. PATENT DOCUMENTS 3,079,968 A    3/1963    Buckley
3,703,843 A    11/1972    Laverty
(Continued)

FOREIGN PATENT DOCUMENTS

DE    3510300    9/1986
DE    102012215645 A1    12/2013
(Continued)

OTHER PUBLICATIONS

Russian Federal Service for Intellectual Property, English Translation of Office Action, dated Jun. 24, 2022, pp. 1-5, Application No. 2020141145/28(076624), Applicant: EJOT GMBH & Co. KG.
(Continued)

*Primary Examiner* — Gary W Estremsky
(74) *Attorney, Agent, or Firm* — WOODLING, KROST AND RUST

(57) ABSTRACT

A self-tapping screw (10, 30) comprising a drive (12) and a shank (14) bearing a thread comprising a main thread (16, 32), wherein the main thread (16, 32) has a maximum main thread external diameter ($D_{AF}$) and a cutting area (F) and a supporting area (T) following in the direction of the drive (12), wherein the shank (14) has a threaded end (18) at an end opposite the drive (12), with the screw end (18) having a diameter (DE) of at least 20% of the maximum main thread external diameter ($D_{AF}$), The shank further has, in the region
(Continued)

of the screw end (18), a tap flute (20), wherein the tap flute (20) comprises at least two tapping thread turns (20a, 20b, 20c) which attain, in their external diameter ($D_{AA}$), no more than 90% of the maximum main thread external diameter ($D_{AF}$) and form a tap region in which the tapping thread turns (20a, 20b, 20c) have the same diameter development, and in addition in that the diameter of the main thread (16, 32) in the tap flute region (AB) is less than or equal to the diameter ($D_{AA}$) of the tapping thread turns (20a, 20b, 20c).

15 Claims, 4 Drawing Sheets

(58) Field of Classification Search
USPC ........................................................ 411/387.4
See application file for complete search history.

(56) References Cited

U.S. PATENT DOCUMENTS

| | | | |
|---|---|---|---|
| 3,861,269 A | | 1/1975 | Laverty |
| 4,329,099 A | | 5/1982 | Shimizu et al. |
| 4,874,278 A | | 10/1989 | Kawashita |
| 5,190,426 A | | 3/1993 | Wieder et al. |
| 5,273,383 A | * | 12/1993 | Hughes ............... F16B 25/0015 411/311 |
| 5,885,041 A | * | 3/1999 | Giannuzzi ........... F16B 25/0047 411/258 |
| 6,604,901 B1 | | 8/2003 | Grossberndt et al. |
| 7,677,854 B2 | | 3/2010 | Langewiesche |
| 7,950,888 B2 | | 5/2011 | Dohi |
| 9,581,183 B2 | * | 2/2017 | Lajewardi ............. F16B 25/103 |
| 9,695,859 B2 | | 7/2017 | Wu |
| 2004/0096291 A1 | | 5/2004 | Reiter |
| 2005/0129484 A1 | * | 6/2005 | Huang .................... F16B 25/00 411/389 |
| 2005/0158149 A1 | * | 7/2005 | Panasik .................... B21H 3/02 411/411 |
| 2005/0191150 A1 | * | 9/2005 | Bickford ............. F16B 25/0068 411/412 |
| 2008/0014047 A1 | | 1/2008 | Dohi |
| 2008/0286072 A1 | * | 11/2008 | Stiebitz ............... F16B 25/0073 411/387.5 |
| 2010/0047035 A1 | | 2/2010 | Rosenkranz et al. |
| 2010/0278614 A1 | * | 11/2010 | Bickford ............. F16B 25/0068 411/417 |
| 2011/0305541 A1 | | 12/2011 | Shinjo |
| 2013/0302111 A1 | | 11/2013 | Shih |
| 2013/0336744 A1 | * | 12/2013 | Phua .................... F16B 25/0026 411/387.1 |
| 2014/0044499 A1 | | 2/2014 | Torii et al. |
| 2015/0198196 A1 | * | 7/2015 | Horiuchi ................. F16B 35/04 411/412 |
| 2015/0376764 A1 | * | 12/2015 | Bickford ................. C23C 10/28 148/318 |
| 2016/0032956 A1 | * | 2/2016 | Wu ......................... F16B 25/10 411/387.8 |
| 2018/0209465 A1 | * | 7/2018 | Lin ..................... F16B 25/0052 |

FOREIGN PATENT DOCUMENTS

| | | |
|---|---|---|
| DE | 102015120470 A1 | 6/2017 |
| DE | 102016109460 | 11/2017 |
| GB | 1004883 | 9/1965 |
| GB | 1427311 | 3/1976 |
| GB | 1438475 | 6/1976 |
| GB | 2476838 B | 7/2011 |
| JP | H10103321 | 4/1998 |
| JP | 11062934 | 3/1999 |
| JP | 201107932 | 4/2001 |
| JP | 2007100741 | 4/2007 |
| JP | 2007285336 | 11/2007 |
| RU | 94033305 | 7/1996 |
| TW | M385613 U1 | 8/2010 |
| WO | 0212736 | 2/2002 |
| WO | 2912007368 | 1/2012 |
| WO | 2017088947 | 6/2017 |

OTHER PUBLICATIONS

Russian Federal Service for Intellectual Property, Office Action, dated Jun. 24, 2022, pp. 1-4, Application No. 2020141145/28(076624), Applicant: EJOT GMBH & Co. KG.
Taiwanese Intellectual Property Office of the Ministry of Economic Affairs, Office Action, dated Jul. 20, 2022, pp. 1-11.
Taiwanese Intellectual Property Office of the Ministry of Economic Affairs, English Translation of the Office Action, dated Jul. 20, 2022, pp. 1-12.
Japan Patent Office, Office Action, dated Aug. 26, 2022, pp. 1-4, Application No. 2020-570106.
Japan Patent Office, Office Action, dated Aug. 26, 2022, pp. 1-7, Application No. 2020-570106.
Intellectual Property Office of Singapore, Office Action, dated Apr. 29, 2022, pp. 1-9, Patent Application No. 11202012666S.
The International Bureau of WIPO, International Preliminary Report On Patentability, Translation, dated Dec. 22, 2020, pp. 1-8.
German Patent and Trademark Office, Search Report, dated Feb. 14, 2019, pp. 1-8, Application No. 102018114983.2.
European Patent Office, International Search Report, dated Oct. 2, 2019, pp. 1-6, Application No. PCT/EP2019/066533.
European Patent Office, Written Opinion, Application No. PCT/EP2019/066533.
Chinese National Intellectual Property Administration, First Office Action, dated Feb. 25, 2022, pp. 1-9, Application No. 201980041060.9 Applicant: EJOT GMBH & Co. KG.
Chinese National Intellectual Property Administration, Translation of First Office Action, dated Feb. 25, 2022, pp. 1-5, Application No. 201980041060.9 Applicant: EJOT GMBH & Co. KG.
Taiwanese Office Action dated May 9, 2023, Serial No. 11220441310.

* cited by examiner

SELF-TAPPING SCREW

This patent application is the national phase entry of PCT/EP2019/066533, international application filing date Jun. 21, 2019, which claims the benefit and priority of and to German patent application no. 10 2018 114 983.2, filed Jun. 21, 2018.

PCT/EP2019/066533, international application filing date Jun. 21, 2019 and German patent application no. 10 2018 114 983.2, filed Jun. 21, 2018 are incorporated herein by reference hereto in their entireties.

The invention relates to a self-tapping screw.

BACKGROUND OF THE INVENTION

In a manner known per se, for example from EP 0 948 719 B1, a screw, adapted in particular to be screwed into plastic material, comprises a drive and a threaded shank. The screw further comprises a main thread, said main thread having a maximum main thread outer diameter. The main thread has a load bearing area and a thread cutting area, with the thread cutting area ending at the point of the thread turn at which the female thread has been completed.

On the shank of the screw, at its end facing away from the drive, the screw has a screw end of a diameter of at least 20% of the maximum main thread outer diameter.

SUMMARY OF THE INVENTION

It is the object of the invention to provide a screw with improved insertion properties.

The invention provides for the shank to additional include, in the area of the screw end, a tap flute, which tap flute comprises at least two tapping thread turns. The outer diameter of these tapping thread turns is no more than 90% of the maximum outer diameter of the main thread. A tap flute region is thus formed on the screw in which the tapping thread turns have the same diameter profile, and wherein, moreover, the diameter of the main thread in the tap flute region is less than or equal to the diameter of the tapping thread turns.

The advantage of this is that the tapping thread turns make for quick and straight initial insertion of the screw in a pilot hole made in a component, in particular of a plastic material, resulting in an as precise as possible alignment of a load bearing area following the thread cutting area. This allows the load bearing area to proceed along the female thread pre-cut by the thread cutting area and thus cause less friction during the screw insertion process.

In an advantageous embodiment of the invention, the main thread in the tap flute region has the same diameter as the tap flute itself. As a result, in this region, the main thread can serve as a tapping thread turn and ensure uniform engagement with the wall of the pilot hole into which the screw is inserted. A main thread having two tapping thread turns can thus in particular be used to ensure that the screw is optimally centered and aligned.

Alternatively, three tapping thread turns can be provided, with the diameter of the main thread in the tap flute region being smaller than the diameter of the tap flute itself. In this embodiment, only the tapping thread turns are used for centering the screw, with the main thread cutting the female thread only afterwards.

Preferably, the tapping thread turns start at the core in the area of the screw end and continuously expand their diameter from the beginning of the core. This ensures even and fast centering of the screw during tapping.

In particular, the thread turns having the same outer diameter are evenly distributed around the circumference of the tap flute region. This also facilitates centering of the screw.

Furthermore, the diameter of the screw end can be at least 30%, at least 40%, at least 50%, at least 60% of the main thread outer diameter. This results in the formation of a blunt screw end, so that after only a short insertion distance, the screw will already be guided by the pilot hole.

It is particularly preferred for all thread turns in the tap flute region to have their beginning in the same cross-sectional plane. This ensures even contact of the thread turns in the tap flute region over the entire tap flute region.

According to another advantageous embodiment, all threads in the tap flute region can have the same thread design, especially the same thread profile.

Preferably, the tap flute starts directly at the end of the screw. This provides a fast centering function.

Alternatively, the tap flute can start at a distance from the end of the screw. In this way, the area towards the end of the screw can fulfil a locating function.

The tap flute thread and the main thread can be rolled threads, thus permitting their production at low costs.

The tap flute and the main thread may have a flank angle in the tap flute region that is more obtuse than the flank angle of the main thread outside the tap flute region. This allows the centering function of the tap flute region and the cutting function of the main thread to be specifically taken into account.

After the tap flute has reached its maximum outer diameter, it can run out abruptly. This reduces friction, especially when the screw is inserted into a narrow pilot hole.

Furthermore, the invention may provide for the tap flute to extend over a maximum of two turns. This ensures sufficient guidance, while still ensuring an effective screw connection.

According to the invention, there may also be interruptions of the thread turns, with the interpolated course of the thread outer diameter remaining the same.

According to the invention, the insertion torque can be further reduced in that the maximum main thread outer diameter lies in the cutting area, with its outer diameter furthermore also being smaller in the bearing area. As a result, the bearing area turns following the cutting area are screwed into a female thread that has been cut slightly larger, thus reducing the friction experienced by the thread turns. This has an especially positive effect when the screw is screwed into a plastic material.

Preferably, the thread cross-sectional profile in the area of the maximum main thread outer diameter is larger at least in its radially outer area of the thread cross-sectional profile than the thread cross-sectional profile in the bearing area in this area. The radially outer area is about 85% of the maximum main thread diameter.

Additional advantages, features and possible applications of the present invention may be gathered from the description which follows in which reference is made to the embodiments illustrated in the drawings.

DESCRIPTION OF THE INVENTION

Figure 1:
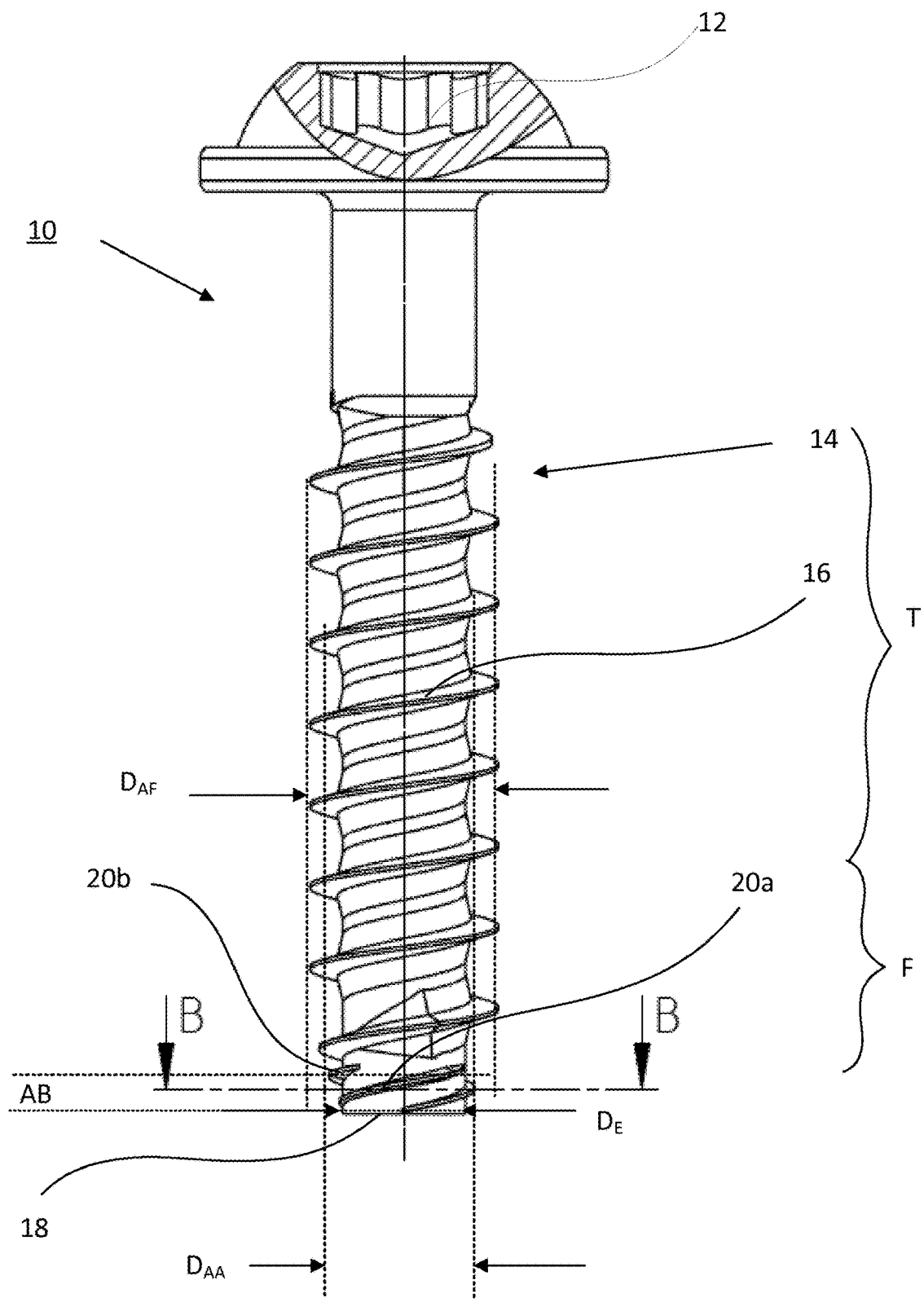
FIG. 1 is a lateral view of a screw according to the invention.

The view of FIG. 1 shows a self-tapping screw 10 with a screw shank 14 and a screw drive 12. The threaded shank 14 has a main thread 16, which has a cutting area F and a bearing area T. The cutting area F ends at the point on the main thread 16 where the female thread has been completed, after which the bearing area T then follows. This is the case after about two turns of the main thread 16 starting from the free end of the screw 18.

In this example, the cutting area F and the bearing area T are parts of the same thread turn, so that there is no actual transition between the bearing area T and the cutting area F. At the end of the screw opposite the drive, i.e. at the "tip", a tap flute region AB is provided according to the invention. In this example, the tap flute region AB is formed by two thread turns 20a, 20b extending from the screw core directly at the screw end 18 and continuously increasing their diameter $D_{AA}$ towards the drive 12 up to the end of the tap flute region AB. The tapping thread turns 20a, 20b have their maximum outer diameter $D_{AA}$ at the end of the tap flute region AB. This diameter is less than 90% of the diameter $D_{AF}$ of the main thread 18. As a result, the holding properties of the tap flute 20 are not impaired and a centered and straight initial insertion of the screw 10 is still possible. In the tap flute region AB, the main thread 18 runs in the same way as the tapping thread turns 20a, 20b.

Figure 2:
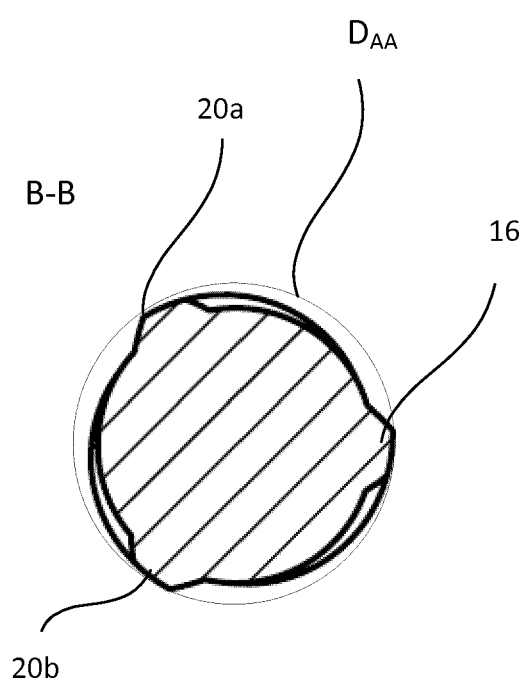
FIG. 2 is a view of a cross-section through the screw shank of FIG. 1 taken along line B-B in the tap flute region of the screw.

Shown in FIG. 2 is a cross-sectional view taken along line B-B approximately through the middle of the tap flute region AB. This cross-sectional view shows the tapping thread turns 20a, 20b and the main thread 16. At this point all threads have the same diameter $D_{AA}$. Although diameter $D_{AA}$ increases steadily from the end of the screw towards the drive, this diameter is the same in every cross-sectional plane in the tap flute region AB.

Figure 3:
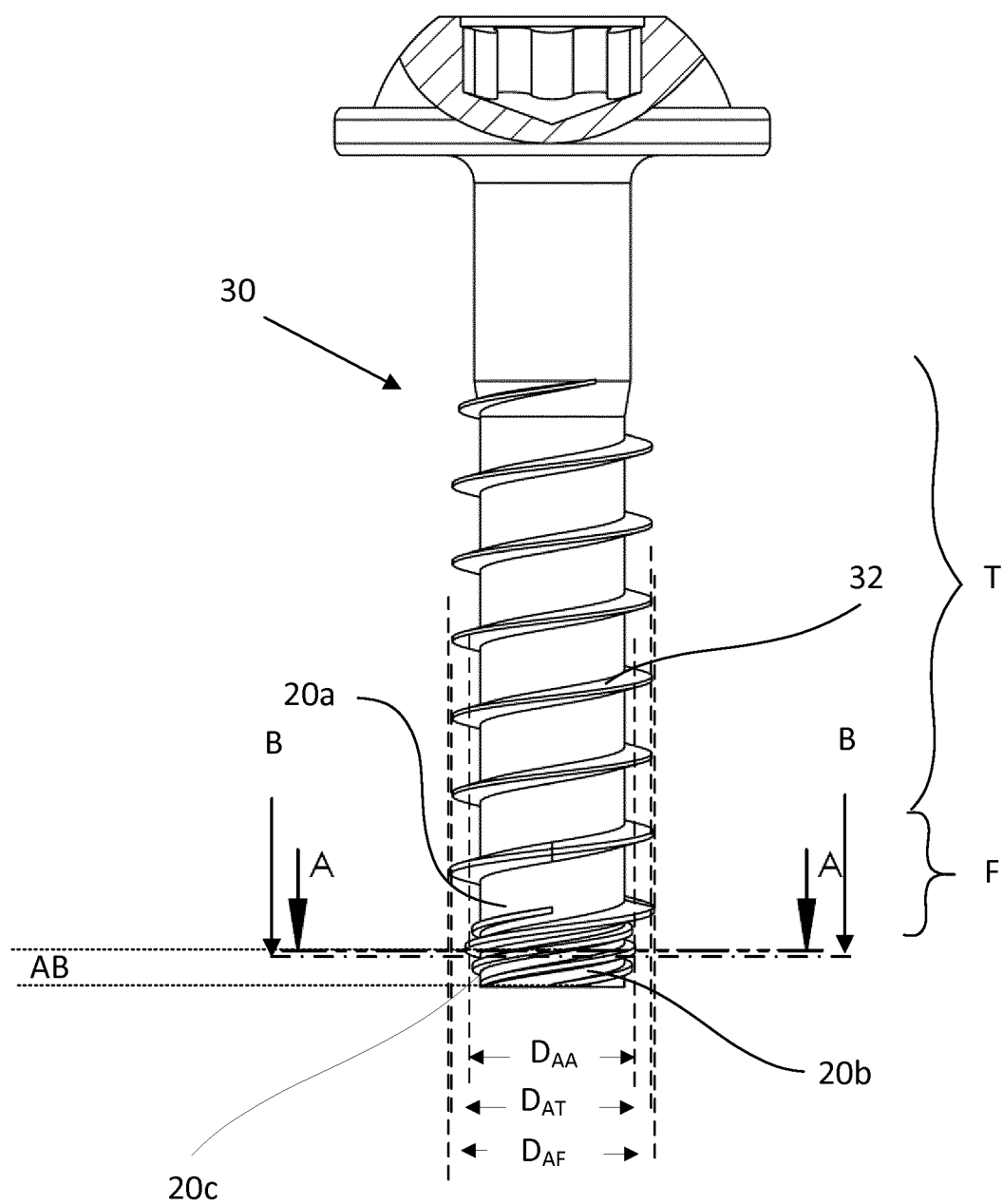
FIG. 3 is a lateral view of a screw according to the invention having three tapping thread turns.

FIG. 3 is a lateral view of another embodiment of a screw according to the invention, which screw is provided with three tapping threads 20a, 20b, 20c, and its main thread 32 in the tap flute region AB has a smaller diameter than the tapping threads 20a, 20b, 20c.

The main thread 32 thus begins in the tap flute region AB between the tapping thread turns 20a, 20b, 20c and increases in diameter in such a way that at the end of the tap flute region AB it will eventually be the same as the diameter of the tapping thread turns 20a, 20b, 20c. From the end of the tap flute region AB, the tap flute 20 runs out and the main thread 32 extends further along the shank. The thread turn diameters are shown in the cross-sectional view of FIG. 4a, taken along line A-A, of the end of the tap flute region AB, and in the cross-sectional view of FIG. 4b, taken along line B-B, of the shank. Furthermore, following the tap flute region AB, the main thread turn 32 has a cutting area F and a bearing area T in the direction of the head.

The maximum main thread outer diameter $D_{AF}$ is in the cutting area F, after which the female thread has been produced after cutting area F. The bearing area T following the cutting area in the direction of the drive has an outer diameter $D_{AT}$ which is smaller than the maximum main thread outer diameter $D_{AF}$.

This thus reduces the friction experienced by the bearing area T which follows after the cutting area F during the screw insertion process. This results in a low screw insertion torque.

It is to be noted that the invention also relates to screws which have a cutting area F of the design illustrated in FIG. 1 and a main thread 32 of the design illustrated in FIG. 3 having a maximum main thread outer diameter $D_{AF}$ in the cutting area F and a smaller outer diameter $D_{AT}$ in the bearing area.

Figure 4A:
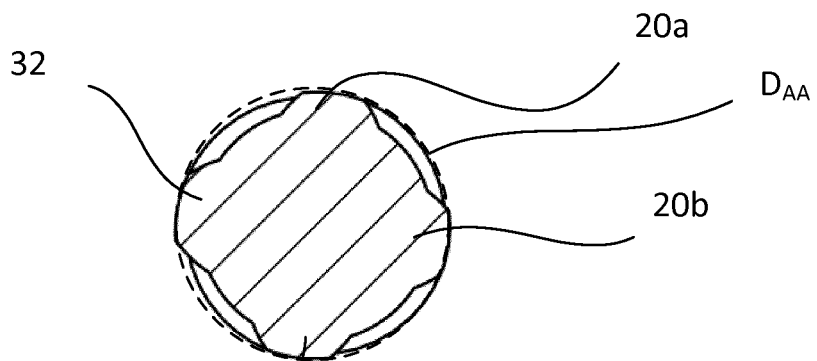
FIG. 4a is a view of a cross-section through the screw shank of FIG. 3 taken along line A-A in the tap flute region.

FIG. 4a is a view of a cross section, taken along line A-A, through the screw shank at the end of the tap flute region AB. All threads have the same outer diameter $D_{AA}$ at this position.

Figure 4B:
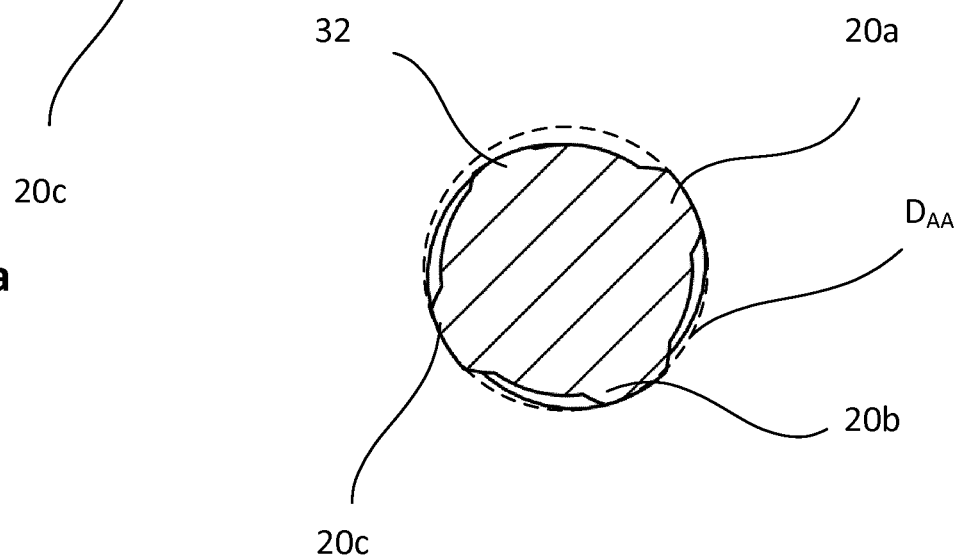
FIG. 4b is a view of a cross-section through the screw shank of FIG. 3 taken along line B-B in the tap flute region.

FIG. 4b is a view of a cross-section, taken along line B-B, approximately in the middle of the tap flute region AB. This view clearly shows that the main thread 32 is within the outer diameter $D_{AA}$ defined by the tapping thread turns 20a, 20b, 20c.

Figure 5:
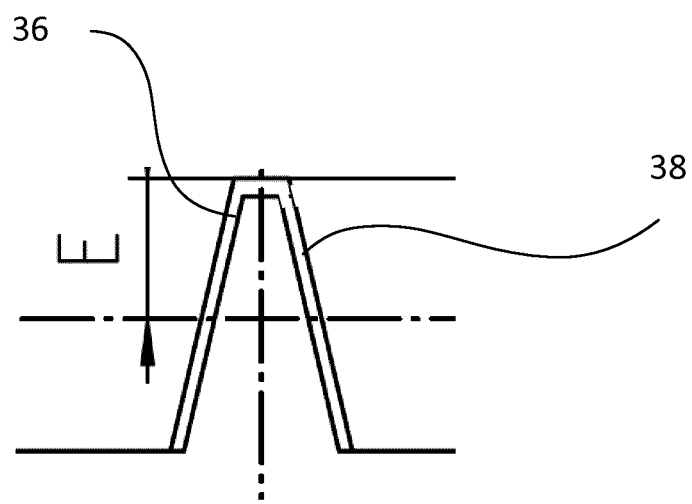
FIG. 5 is a comparative view of the thread profile contour in the cutting area and a thread profile contour in the bearing area of the main thread.

FIG. 5 is a comparative view of the thread profile contour in the cutting area and a thread profile contour in the bearing area of the main thread. The view of FIG. 5 further shows that the cross-sectional profile 38 of the thread in the area of the maximum outer diameter $D_{AF}$ of the main thread is larger at least in its radially outer area E of the thread cross-sectional profile than the cross-sectional profile 36 of the thread in the bearing area T in this area E.

The invention claimed is:

1. Self-tapping screw (10, 30), comprising:
    a drive (12),
    a shank (14) bearing a thread comprising a main thread (16, 32),
    said main thread (16, 32) has a maximum main thread outer diameter ($D_{AF}$), cutting area (F) and a bearing area (T) following in the direction of said drive (12),
    said shank (14) has a screw end (18) at an end thereof opposite said drive (12),
    said screw end (18) has a diameter ($D_E$) of at least 20% of said maximum main thread outer diameter ($D_{AF}$),
    said shank has, in the region of said screw end (18), a tap flute (20),
    said tap flute (20) comprising at least two tapping thread turns (20a, 20b, 20c) which attain, in their outer diameter ($D_{AA}$), no more than 90% of said maximum main thread outer diameter ($D_{AF}$) and form a tap region,
    in said tap region said tapping thread turns (20a, 20b, 20c) have the same diameter,
    said diameter of said main thread (16, 32) in said tap flute region (AB) is less than or equal to said diameter ($D_{AA}$) of said tapping thread turns (20a, 20b, 20c),
    said tap flute (20) has an obtuse flank angle in said tap flute region (AB),
    said main thread (16) has an obtuse flank angle outside said tap flute region (AB), and,
    said tap flute (20) has a flank angle in said tap region (AB) which is more obtuse than said flank angle of said main thread outside said tap flute region (AB).

2. Self-tapping screw according to claim 1, further comprising:
    said diameter of said main thread (16, 32) in said tap flute region (AB) is identical to said diameter ($D_{AA}$) of said tap flute.

3. Self-tapping screw according to claim 1, further comprising:
said tapping thread turns (20a, 20b, 20c) are provided,
said diameter of said main thread (D) in said flute region being smaller than said diameter ($D_{AA}$) of said tap flute (20).

4. Self-tapping screw according to claim 1, further comprising:
said tapping thread turns (20a, 20b, 20c) in the area of said screw end (18) start at a core and constantly increase in diameter.

5. Self-tapping screw according to claim 1, further comprising:
said tapping thread turns (20a, 20b, 20c) of said same outer diameter ($D_{AA}$, D) are equally distributed around the circumference of said tap flute region (AB).

6. Self-tapping screw according to claim 1, further comprising:
said screw end (18) has a diameter ($D_E$) of at least 20% of said main thread outer diameter ($D_{AF}$).

7. Self-tapping screw according to claim 1, further comprising:
all thread turns in said tap flute region (AB) start in the same cross-sectional plane.

8. Self-tapping screw according to claim 1, further comprising:
all thread turns (20a, 20b, 16) in said tap flute region (AB) are of identical thread shape.

9. Self-tapping screw according to claim 1, further comprising:
said tap flute (20) starts immediately following said end of said screw (18).

10. Self-tapping screw according to claim 1, further comprising:
said tap flute (20) starts at a distance from said screw end (18).

11. Self-tapping screw according to claim 1, further comprising:
said tap flute (20) and said thread (16) are rolled threads.

12. Self-tapping screw according to claim 1, further comprising:
said tap flute (20) runs out abruptly.

13. Self-tapping screw according to claim 1, further comprising:
said tap flute (20) extends over a maximum of two turns.

14. Self-tapping screw according to claim 1, further comprising:
said main thread has its maximum outer diameter ($D_{AF}$) in said cutting area (F), with its outer diameter ($D_{AT}$) being smaller in said bearing area (T).

15. Self-tapping screw according to claim 14, further comprising:
the cross-sectional profile (38) of the thread in the area of said maximum main thread outer diameter ($D_{AF}$) is larger at least in its radially outer area (E) of said cross-sectional profile of said thread than said cross-sectional profile (36) of said thread in said bearing area (T) in said radially outer area (E).

* * * * *